C. H. CLARK.
FLEXIBLE COUPLING.
APPLICATION FILED MAY 22, 1915.
1,303,853.
Patented May 20, 1919.
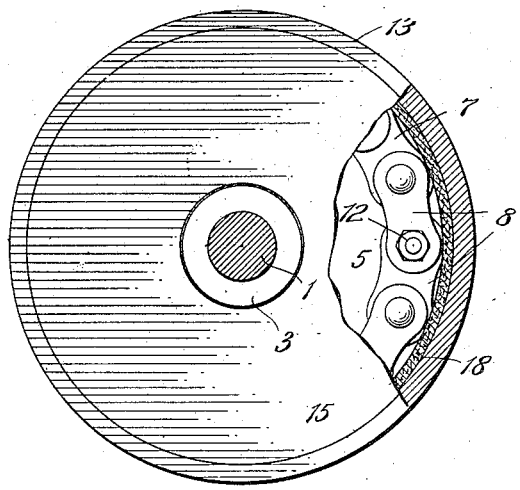
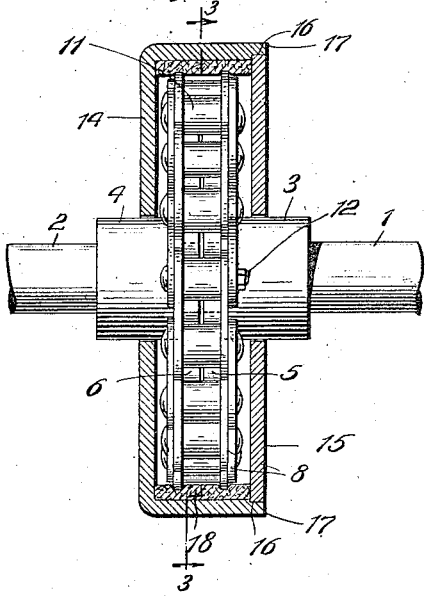
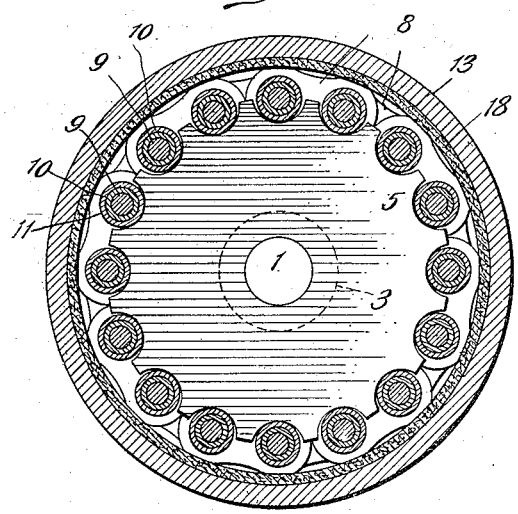
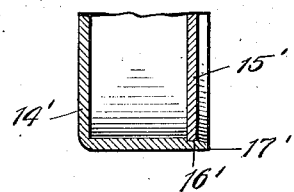
WITNESS
INVENTOR
Charles H. Clark
BY
Robert W Byerly
ATTORNEY

UNITED STATES PATENT OFFICE.

CHARLES HASKELL CLARK, OF NEW YORK, N. Y.

FLEXIBLE COUPLING.

1,303,853.	Specification of Letters Patent.	Patented May 20, 1919.

Application filed May 22, 1915. Serial No. 29,728.

*To all whom it may concern:*

Be it known that I, CHARLES H. CLARK, a citizen of the United States, residing at New York city, in the county of New York, in the State of New York, have invented certain new and useful Improvements in Flexible Couplings, of which the following is a specification.

This invention relates to flexible couplings, such as are described in application for Letters-Patent Serial Number 813,140, filed by me January 19th, 1914, and has for its object to provide an improvement in the construction illustrated in said application, which is of peculiar importance when the coupling is used in connection with high speeds.

The flexible coupling described in my aforesaid application comprises two adjacent sprocket-wheels or sprocket-cut disks mounted respectively upon the two shafts to be coupled together and held together by means of a chain, which is of a width equal to the combined width of the sprocket-wheels, so that it may engage the teeth of both. This chain must be kept properly lubricated in order for the coupling to operate satisfactorily. No difficulty has been found in lubricating the chain by ordinary means when the coupling is used upon shafting revolving at a moderate speed. It has been found, however, that when the coupling is rotated at a high rate of speed any oil or grease upon the chain is thrown off by centrifugal force, so that the chain cannot be kept properly lubricated.

An object of the present invention is to provide means for keeping the chain of the flexible coupling lubricated at high speeds. A further object is to prevent rattling of the chain, especially when the shafts coupled are badly out of alinement. These and other objects are accomplished by a rotating casing, the form and construction of which are hereinafter described.

In order that my invention may be clearly understood, I will describe a specific embodiment of it which is illustrated in the accompanying drawing, in which—

Figure 1 is an end view of the coupling showing a portion of the casing broken away;

Fig. 2 is an edge or side view of the coupling showing the casing in section;

Fig. 3 is a sectional end view of the coupling taken through the center line of Fig. 2;

Fig. 4 is a fragmentary sectional view of a casing of modified construction.

In the embodiment of the invention shown in the drawing, the members to be coupled together are the shafts 1 and 2. Upon the ends of these shafts, respectively, are mounted the hubs 3, 4, bearing the sprocket-wheels or sprocket-cut disks 5, 6. The sprockets of these sprocket-wheels may be cut off along the pitch line, as shown in Fig. 3. Surrounding both sprocket-wheels and engaging the sprocket-notches of both is the loop of chain 7. The chain shown in the drawing is what is known as a roller-chain, consisting of links comprising side bars 8, connected by means of pivots, which, in the form shown, consist of rivets 9, surrounded by bushings 10, which are surrounded by cylindrical rollers 11. In one of the pivots, a bolt 12 is used instead of a rivet, in order that the device may be assembled and taken apart.

In the drawing, the shafts 1, 2, are shown in exact alinement. As pointed out in my previous application hereinbefore referred to, the flexibility of the coupling renders unnecessary exact alinement of the shafts. They are here shown in such alinement merely for convenience in illustration.

Surrounding the coupling is an annular casing 13, one side and the end of which are composed of an integral piece of material 14. An annular disk 15 forms the other side of the casing. This disk is driven into engagement with a recess 16 in the part 14. The central apertures in the parts 14 and 15 which surround the hubs 3 and 4 are made sufficiently large to prevent binding when the shafts, and, consequently, the hubs, are slightly out of alinement. I have found a play of one-sixty-fourth of an inch in radius satisfactory.

Before the casing 13 is assembled, it is filled with heavy grease or oil. It is then placed about the coupling, and the disk 15 is driven into the part 14. When the shafts are rotated, the casing rotates with them and, consequently, the oil or grease in the casing is thrown by centrifugal force against the cylindrical inner surface of the casing. In this position, it serves adequately to lubricate the chain 7, all parts of the chain being immersed in the grease. The joint between the parts 15 and 14 of the casing is oil-tight, so that the grease cannot escape from the casing.

When it is desired to take the casing apart in order to take apart the coupling, or for any other reason, it is merely necessary to strike the edge 17 of the part 14 with a hammer. This drives the part 14 from the disk 15, the disk being held against the wheel 5. If the casing is made of thin metal, difficulty may be experienced in hitting the edge 17 of the part 14 without at the same time bringing the hammer in contact with the disk 15. In order to avoid this difficulty in taking apart when thin metal is used, the modification shown in Fig. 4 may be used. In this form the part 14' has a tapering lip 17' extending beyond the recess 16', into which the disk 15' is driven. In taking apart, it is merely necessary to strike the end of this lip 17' with a hammer.

By constructing the casing in either of the ways illustrated, I avoid the necessity of using any bolts or other attaching means in connection with the casing.

A felt lining 18 is preferably used upon the inner cylindrical surface of the casing. This lining is soft and resilient and is of such thickness that it comes into contact with the chain 7. This lining performs an important function in tending to hold the links of the chain closely against the sprocket-wheels and thus to prevent the rattling which would otherwise be caused by the necessary play of the chain, especially where the shafts are badly out of alinement. Under reciprocating loads, springs adapted to hold the chain closely against the sprocket-notches may, if desired, be used within the casing. Such springs as are shown in my co-pending application Serial Number 29,243, filed May 18th, 1915, may be used, even though a felt lining is used in the casing, as the softness and elasticity of the lining is sufficient to permit their operation.

It is obvious that many changes may be made in the specific embodiment illustrated without departing from the spirit of my invention. It is not necessary, for example, that the sides of the coupling be extended to have a running contact with the hubs or shafts, as the casing may be borne entirely by the chain, especially if the lining is used. The casing need not be of the specific construction shown, and, while it is desirable that the casing should be removable, the line on which its component parts come together need not be circumferential, as shown, but may be diametrical.

What I claim is:—

1. A flexible coupling comprising two adjacent sprocket-wheels mounted, respectively, on the members to be coupled, a chain encircling said sprocket-wheels, an annular casing surrounding said chain and a lining of soft material in said casing contacting with said loop of chain.

2. A flexible coupling comprising two adjacent sprocket-wheels, a loop of chain consisting of pivotally connected links encircling said sprocket-wheels, a rigid member encircling said loop of chain, and a resilient member contacting with the links of said chain and with said rigid member.

3. The combination of a shaft-coupling, a casing surrounding same comprising a cylindrical member having closed ends, one of said end-members being driven into its corresponding end of said cylinder and adapted to be forced out by said coupling when said casing is forced longitudinally of the shaft.

4. A flexible coupling comprising disks, mounted on the members to be coupled, connecting means surrounding the disks, an annular casing surrounding the connecting means, said casing being out of contact with said disks, and means interposed between the disk-connecting means and the casing to maintain said casing in concentric position relative to the axes of said disks.

CHARLES HASKELL CLARK.